Sept. 15, 1931.  W. A. RIDDELL  1,823,294
PHOTOGRAPHIC SHUTTER SETTING MECHANISM
Filed Dec. 20, 1929
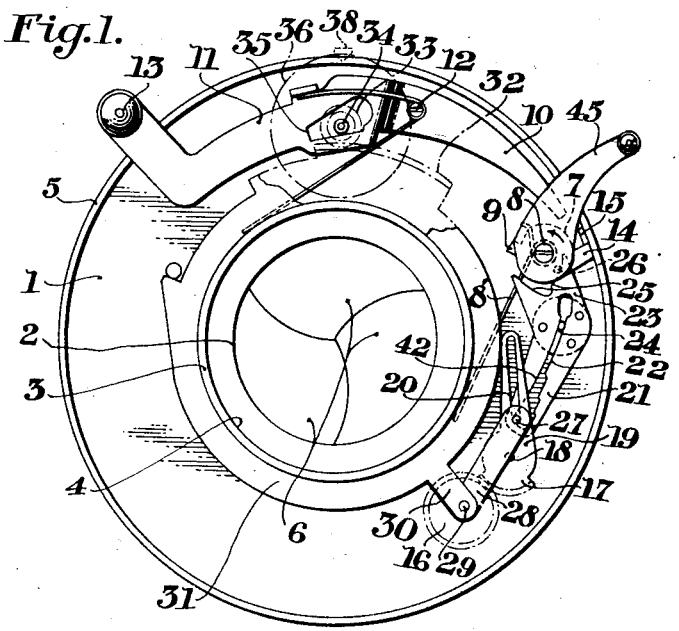
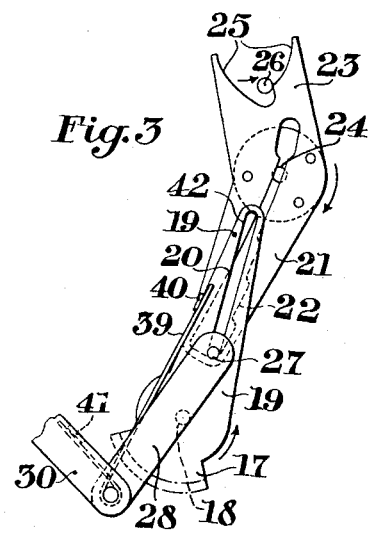
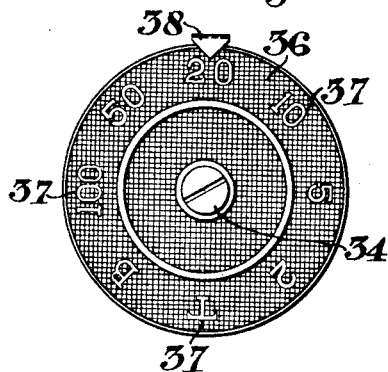
Inventor,
William A. Riddell,
By
Attorneys Patented Sept. 15, 1931

1,823,294

UNITED STATES PATENT OFFICE

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK

PHOTOGRAPHIC SHUTTER SETTING MECHANISM

Application filed December 20, 1929. Serial No. 415,473.

This invention relates to photography and more particularly to photographic shutters. One object of my invention is to provide a shutter with a simple type of setting device in which the dial indicating the different automatic times of exposure, which may be obtained with the shutter, is divided into comparatively evenly spaced units. Another object of my invention is to provide a shutter with a setting mechanism which can be easily moved to a definite setting in which the retarding device will be definitely positioned for a predetermined timing action and other objects will appear from the following specification, the novel features being particularly pointed out in the claims at the end thereof.

Coming now to the drawings wherein like reference characters denote like parts throughout:

Fig. 1 is a plan view of portions of a photographic shutter constructed in accordance with and embodying a preferred form of my invention;

Fig. 2 is an enlarged view of a setting dial removed from the shutter shown in Fig. 1;

Fig. 3 is an enlarged fragmentary view of the adjusting member to vary the relation between the retarding mechanism and the master member.

This shutter has features in common with the shutter shown in Patent 1,341,823, Riddell and Pirwitz, June 1, 1920, particularly the retarding gear train.

The shutter may consist of a shutter casing including a bottom wall 1 having an annular opening 2 around which a wall 3 extends, this wall usually being threaded on the inside 4 to receive one element of an object. The casing 1 is also provided with an upstanding flange 5 around the outside to support a shutter cover. The opening 2 is normally closed by a plurality of shutter levers 6 which may be operated from a master member 7 in the manner shown in my copending application, Serial No. 340,239, filed Feb. 15, 1929, now matured into Patent No. 1,754,202 issued April 8, 1930.

The master member designated broadly as 7 may consist of a central post 8 having a lug 9 adapted to contact with one end 10 of a tripping lever 11 pivoted at 12 to the shutter casing and having a release trigger 13 extending outside of the shutter casing.

In its position of rest as shown in Fig. 1 the master member is limited in its movement through contact of a second lug 14 with a lug 15. On the shutter casing the power spring 8' normally tends to turn the master member in the direction shown by the arrow but the master member may be held against the movement of this spring in a set position through contact with the lug 9 and the tripping lever 10.

In order to provide automatic exposures of varying duration a gear train designated broadly as 16 is provided, one member of this gear train meshing with a gear segment 17 adapted to turn upon a pivot 18 and having an extended arm 19 which is slotted at 20. This slot may be of substantially the same width throughout its length.

A second slotted lever 21 is provided with a slot 22 which may vary in width throughout its length or throughout portions of its length, this slotted lever being carried on one end of a yoke 23 which is pivoted upon a stud 24. The ends 25 of the yoke are adapted to engage a pin 26 carried by the master member and this driving connection is fully explained in my copending application for patent, Serial No. 415,472 filed December 20, 1929.

The two slotted levers are joined together so that the movement of one effects the movement of the other by means of a pin 27 carried by link 28 pivoted at 29 to an arm 30 extending outwardly from an annular member 31, this annular member carrying a rack 32 on its upper side.

As indicated in Fig. 1, the rack 32 meshes with a pinion 33 carried upon a shaft 34 extending upwardly from the shutter casing 1 through an opening 35 in the trip lever 11. A dial 36 is also carried by the shaft 34, an enlarged view of the dial being shown in Fig. 2.

As indicated in this figure the dial 36 is provided with a series of graduations 37 indicating the different exposures which may be obtained with this shutter. The numeral 2 on this dial indicates a 1/2 second exposure. The numeral 50 indicates 1/50 second exposure and the other numerals corresponding fraction of a second. B and T indicate bulb and time exposures, all these being well known in the art.

Particular attention is directed to the fact that the graduations 37 on the dial 36 are equally spaced so that it is a comparatively simple matter to bring the proper graduations opposite a pointer 38 which may be carried by the shutter casing 1.

In order to obtain even spacings on the dial 36 the construction best shown in Fig. 3 is employed.

In this figure it should be noted that the slot 22 in the lever 21 varies in width being wider in some places than at others. The slot 20 in the lever 19 is of substantially equal width throughout and the pin 27 of the link 28 is of such a size that it may slide freely without much lost motion in the slot 20.

It might be mentioned here that it is immaterial which of the two slots 20 or 22 has wide and narrow portions, since either one can be used for this purpose.

The reason for the one slot having portions wider than other portions of the slot is that the pivotal points 18 and 24 of the two levers is fixed so that by moving the pin 27 in the two slots the relative relation of the levers is altered and consequently the retarding action of the gear train 16 through the gear segment 17 is altered by moving the position of pin 27 through the two slots. The difference between 1/10 of a second exposure and 1/5 of a second exposure requires less alteration of the relation between two levers than the distance between the 1/5 of a second exposure and 1/2 second exposure consequently the distance between these graduations on the dial (as, of course, also the difference between other graduations) would require normally unevenly spaced graduations and where there might be a very large space between the 1/2 and 1/5 of a second exposure, the space between a 1/100 and a 1/50 of a second exposure might be so small that it would be difficult to set the shutter.

For this reason one of the slots is provided with spaces wider apart than others. Lost motion of one lever is, therefore, permitted in certain settings between lever 22 and lever 19.

It should be noticed from Fig. 3 that there is a spring 39 resting at one end against lug 40 on lever 19 and resting on the other end upon a lug 41 of the arm 30. This spring exerts a pressure upon the pin 27 in a counter-clockwise direction and in its normal position of rest shown in Fig. 1. The pin rests against the side 42 of the slot 21. When an exposure is being made the pin 26 moves in the direction shown by the arrow, Fig. 3, so that the yoke 23 moves about its stud 34 in the direction shown by the arrow and this movement is so rapid that the parts assume the position shown in Fig. 3, in spite of the pressure of spring 39, that is, the pin 27 moves to the side slot opposite 42 and the lever 19 is moved about its pivot in the direction shown by the arrow, Fig. 3, to accomplish its function of retarding the exposure. As soon as the exposure is over and the shutter has been set by the setting lever 45 the spring causes the spring 27 to again return to the position shown in Fig. 1. By thus widening up portions of one of the two slots enough lost motion between the two pivot levers 19 and 22 is permitted to allow the dial 36 to be evenly graded without in any way altering the accuracy of the retarded exposures. Moreover, there are certain advantages in having a small amount of lost motion since the width of the slot permits the lever 22 in the slower exposures to get under motion so that it will, in effect, strike pin 27 a blow thus increasing the efficiency of the retarding action.

The operation of this shutter is extremely simple and can readily be accomplished under averse working conditions since the dial 36 is provided with widely spaced graduations 37 and by merely turning the dial until a graduation comes opposite the pointer 38 the required setting can be procured.

Having thus described my invention, what I claim as new and desire to secure by Letters Patent is:—

1. In a photographic shutter, the combination with a master member, of a retarding device connected to the master member, said connection including a pair of slotted levers and a pin engaging said slots, one slotted lever having a slot of varying width.

2. In a photographic shutter, the combination with a master member, of a retarding device connected to the master member, said connection including a pair of slotted levers and a pin engaging said slots, one slotted lever having a slot of varying width, and a spring for pressing said pin toward one side of said slot.

3. In a photographic shutter, the combination with a master member, of a retarding device connected to the master member, said connection including a pair of slotted levers and a pin engaging said slots, an adjustable arm carrying said pin and means for moving the arm to vary the position of the pin relative to said slotted levers, one lever having a slot of variable width, and a spring for normally holding said pin against one side of said slot.

4. In a photographic shutter, the combination with a master member, of a retarding device connected to the master member, and adapted to be driven in one direction for retarding and in an opposite direction for setting, said connection including a pair of slotted links, the slot in one lever being wider in some places than in others, a pin engaging both slots and a spring for pressing the pin towards that direction in which the retarding device is moved for retarding the master member.

5. In a photographic shutter, the combination with a master member, of a retarding device connected to the master member, said connection including a pair of slotted levers and a pin engaging said slots, one slotted lever having a slot of varying width and the other of said slots being of a width to permit said pin to slide freely therein.

6. In a photographic shutter, the combination with a master member, of a retarding device connected to the master member, said connection including a pair of slotted levers and a pin engaging said slots one slot having portions wider than other portions thereof, a setting dial having substantially equally spaced graduations of time units thereon and connections between said dial and pin for moving the latter in the slots.

7. In a photographic shutter, the combination with a master member of a retarding device connected to the master member, and adapted to be driven in one direction for retarding and in an opposite direction for setting said connection including a pair of slotted links, the slot in one lever being wider in some places than in others, a pin engaging both slots and a spring for pressing the pin towards that direction in which the retarding device is moved for retarding the master member, a setting dial having substantially evenly spaced graduations thereon, and connections between said setting dial and said pin for moving the latter by the former.

8. In a photographic shutter, the combination with a master lever having a driving spring, of a retarding member connected to the master member, said connection including a pair of slotted levers on slot varying in width, a light spring, a movably mounted pin engaging both slots, a light spring for pressing the pin toward one side of the variable width slot, the force of the driving spring being such that the master member operating through a slotted lever moves the pin against the action of the light spring into contact with the other side of the variable width slot.

Signed at Rochester, New York this 16th day of December 1929.

WILLIAM A. RIDDELL.